(12) United States Patent (10) Patent No.: US 9,338,769 B1
Naim et al. (45) Date of Patent: May 10, 2016

(54) METHOD OF SCHEDULING COMMUNICATION IN A WIRELESS COMMUNICATION NETWORK

(71) Applicant: Sprint Spectrum LP, Overland Park, KS (US)

(72) Inventors: Muhammad Naim, Sterling, VA (US); Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 86 days.

(21) Appl. No.: 14/209,639

(22) Filed: Mar. 13, 2014

(51) Int. Cl.
*H04L 12/24* (2006.01)
*H04W 72/04* (2009.01)

(52) U.S. Cl.
CPC .................................. *H04W 72/0413* (2013.01)

(58) Field of Classification Search
CPC ........................... H04W 72/082; H04L 5/0062
See application file for complete search history.

(56) References Cited

U.S. PATENT DOCUMENTS

| | | | |
|---|---|---|---|
| 8,310,961 B2 | 11/2012 | Chindapol et al. | |
| 2010/0099449 A1* | 4/2010 | Borran et al. | 455/501 |
| 2012/0057535 A1 | 3/2012 | Zhang et al. | |
| 2012/0184206 A1* | 7/2012 | Kim et al. | 455/9 |
| 2012/0236800 A1* | 9/2012 | Park et al. | 370/329 |
| 2013/0170439 A1* | 7/2013 | Anderson et al. | 370/329 |
| 2014/0286270 A1* | 9/2014 | Karsi et al. | 370/329 |

FOREIGN PATENT DOCUMENTS

WO 2013112711 A1 8/2013

\* cited by examiner

*Primary Examiner* — Shaq Taha

(57) ABSTRACT

A system and method of scheduling communication in a wireless communication network are provided. A first access node can receive an uplink scheduling request from a wireless device. The first access node can receive a first interference indicator from a second access node when the wireless device is located at the cell edge. A first scheduling scheme for the first access node and a second scheduling scheme for the second access node can be determined based on the uplink scheduling request and the interference indicator. The uplink portions of the first scheduling scheme do not overlap the uplink portions of the second scheduling scheme. The first access node can instruct the wireless device to communicate uplink data to the first access node during the uplink portions of the first scheduling scheme and to communicate uplink data to the second access node during the uplink portions of the second scheduling scheme.

18 Claims, 6 Drawing Sheets

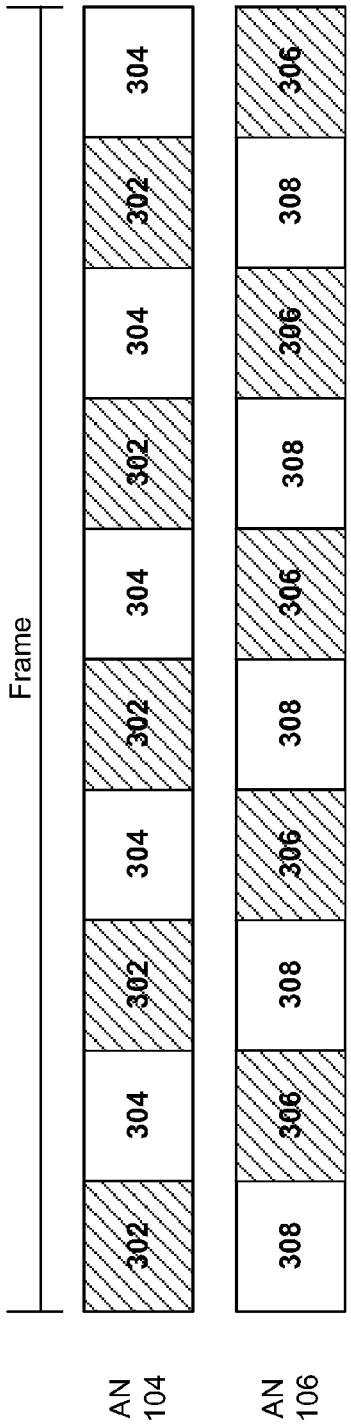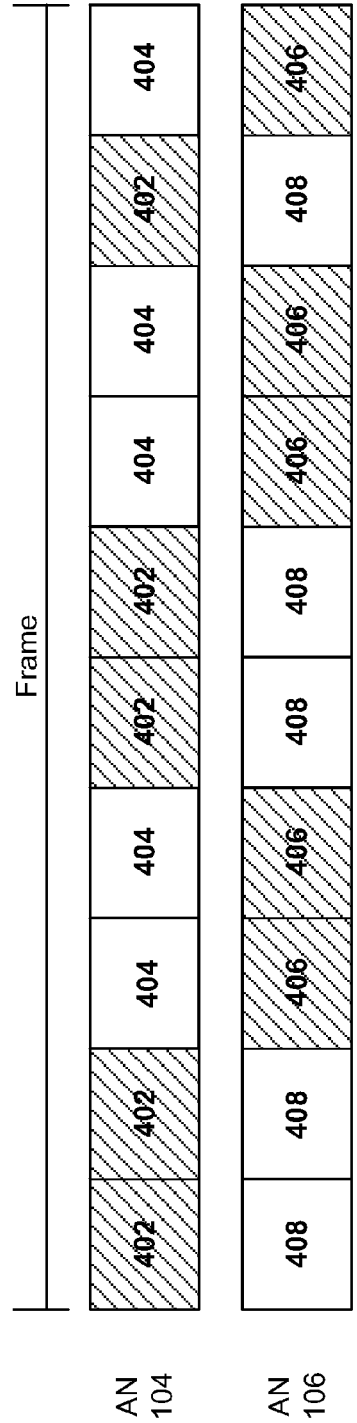

METHOD OF SCHEDULING COMMUNICATION IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of channel access schemes can be used to communicate data over the wireless interface. For example, one type of channel access scheme uses frequency division. Frequency division can provide different frequency bands to different data streams. For example, on one frequency band, all time slots can be available for uplink transmissions and on another frequency band, all time slots can be available for downlink transmissions. In a time division channel access scheme, different time slots are available to different data streams over the same frequency band. Frequency division schemes can provide twice the bandwidth as time division schemes using the same power.

In a wireless network, resources required for uplink transmissions are generally different from resources required for downlink transmissions thus implementing a frequency division scheme can result in unused frequency resources which can undesirably impact transmission in the network. However, coverage and throughput to wireless devices in certain geographical locations within a cell, such as at the cell edge, can be undesirably reduced when time division schemes are implemented due to power limitations.

OVERVIEW

A system and method of scheduling communication in a wireless communication network are provided. A first access node can receive an uplink scheduling request from a wireless device. It can be determined that the wireless device is located at a cell edge based on the uplink scheduling request. The first access node can receive a first interference indicator from a second access node when the wireless device is located at the cell edge. A first scheduling scheme for the first access node and a second scheduling scheme for the second access node can be determined. The first scheduling scheme and the second scheduling scheme can be based on the uplink scheduling request and the interference indicator. The first scheduling scheme and the second scheduling scheme can each comprise uplink portions and downlink portions. The uplink portions of the first scheduling scheme do not overlap the uplink portions of the second scheduling scheme. The first access node can instruct the wireless device to communicate uplink data to the first access node during the uplink portions of the first scheduling scheme and to communicate uplink data to the second access node during the uplink portions of the second scheduling scheme.

BRIEF DESCRIPTION OF THE DRAWINGS

FIG. 3 illustrates other exemplary scheduling schemes for scheduling communication in a wireless communication network.

FIG. 4. Illustrates an exemplary method of scheduling communication in a wireless communication network.

DETAILED DESCRIPTION

Figure 1:
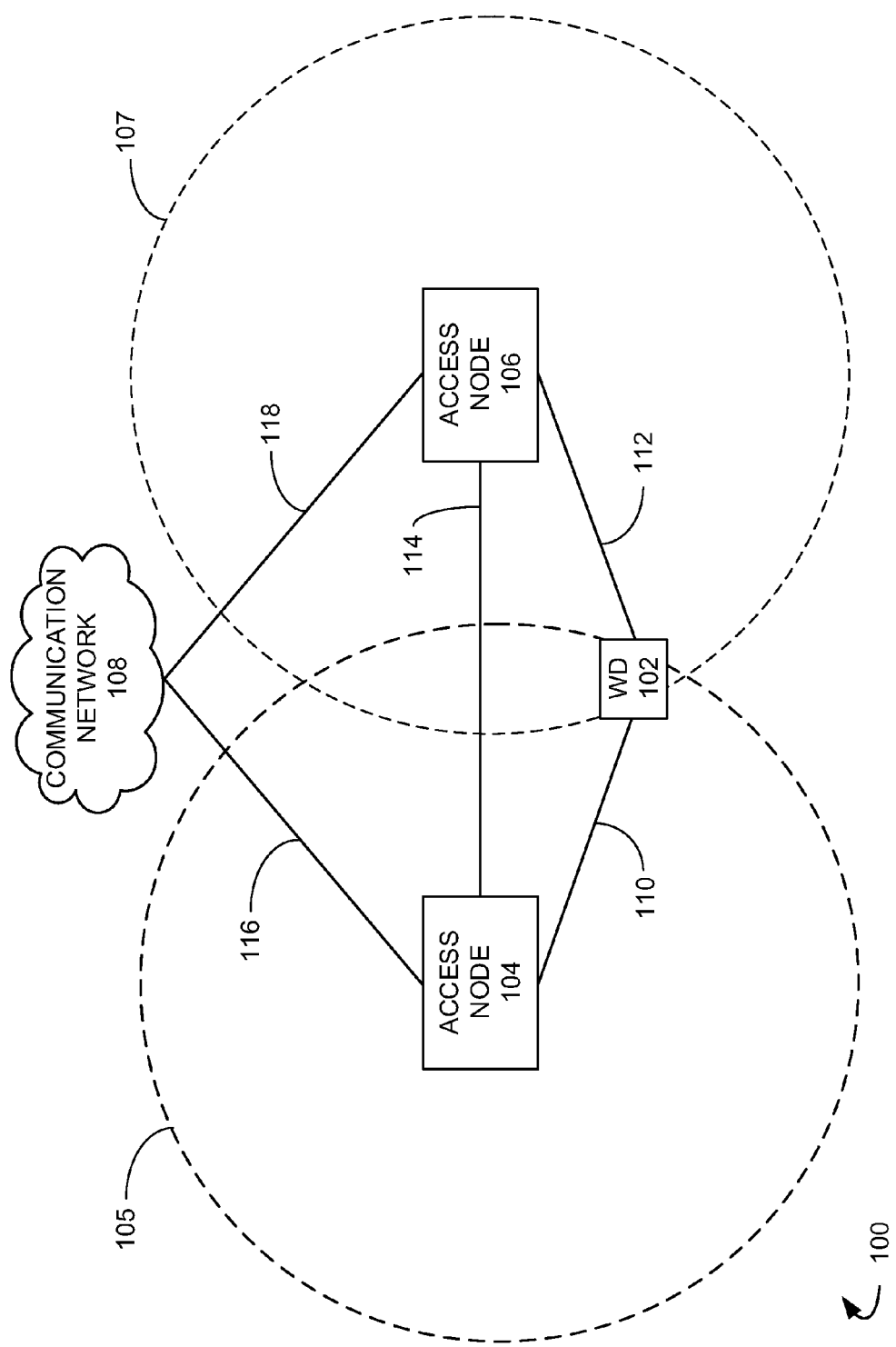
FIG. 1 illustrates a communication system to schedule communications in a wireless communication network.

FIG. 1 illustrates an exemplary communication system 100 for scheduling communication in a wireless communication network. Communication system 100 can comprise a wireless device 102, access nodes 104, 106, and a communication network 108. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 104, 106 and communication network 108, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104 or 106, any number of wireless devices can be implemented according to various exemplary embodiments disclosed herein.

The wireless interface of wireless device 102 can include one or more transceivers for transmitting and receiving data over communication system 100. Each transceiver can be associated with the same or different frequency bands, the same or different radio access technologies, the same or different network providers, and/or the same or different services. For example, wireless device 102 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 104 through communication link 110 or with access node 106 through communication link 112. Links 110, 112 can use various communication media, such as air, space, metal, optical fiber, or some other signal propagation path—including combinations thereof. Communication links 110, 112 may comprise many different signals sharing the same link Communication links 110, 112 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 104 could share the same representative wireless link, but be transferred over different communication sessions, frequencies, timeslots, packets, ports, sockets, logical transport links, or in different directions—including combinations thereof.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 104, 106 can be any network node configured to provide communication between wireless device 102 and communication network 108. Access nodes 104, 106 can be standard access nodes or short range, low power access nodes. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while two access nodes 104, 106 are illustrated in FIG. 1, any number of access nodes can be implemented within system 100.

Access nodes 104, 106 can comprise a processor and associated circuitry to execute or direct the execution of computer-readable instructions to obtain information. Access nodes 104, 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 106 can receive instructions and other input at a user interface.

Access node 104 can be in communication with access node 106 through communication link 114. Access node 104 can be in communication with communication network 108 through communication link 116. Access node 106 can be in communication with communication network 108 through communication link 118. Communication links 114, 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 114, 116, 118 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 108 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

In operation, a first access node such as access node 104 can receive an uplink scheduling request from a wireless device 102. In an exemplary embodiment, access node 104 can be the primary access node associated with wireless device 102 and have a coverage area 105. Access node 106 can be a secondary access node associated with wireless device 102 and have a coverage area 107. A primary access node can be the access node in which wireless device 102 initiates communication with system 100. The primary access node can also be defined as an access node that controls wireless device 102 following a handover from a source access node to a target access node. The primary access node 104 can communicate information associated with wireless device 102, such as context information, to a secondary access node. The information associated with wireless device 102 send from access node 104 to access node 106 can allow wireless device 102 to communicate with access node 106 without discontinuing communication with access node 104. For example, the information can be used to allow wireless device 102 to transmit uplink information to both access node 104 and access node 106.

Wireless device 102 can transmit an uplink scheduling request to access node 104. The uplink scheduling request can be indicative of an amount of data to be transmitted from wireless device 102 to communication network 108. For example, the uplink scheduling request can be indicative of the amount of data stored in a buffer of wireless device 102. The uplink scheduling request can comprise an indication of a total amount of resources requested by the wireless device, an indication of a first signal characteristic associated with the first access node detected at the wireless device, and an indication of a second signal characteristic associated with the second access node detected at the wireless device.

Access node 104 can determine that wireless device 102 is located at the cell edge of the coverage area 105 and coverage area 107 based on the uplink scheduling request. When a wireless device is located at the cell edge, neighboring access nodes can cause interference and undesirable signal deterioration. Access node 104 can receive a first interference indicator from access node 106 when the wireless device 102 is determined to be at the cell edge of coverage area 105 and coverage area 107. The interference indicator can be an indication of the anticipated interference power the wireless device 102 will experience based on the scheduling scheme associated with access node 106. For example, the first interference indicator can be based on an anticipated interference wireless device 102 will experience when downlink data is transmitted from the second access node.

The scheduling scheme of access node 106 can be based on the load associated with access node 106. For example, the load associated with access node 106 can include the amount of uplink and/or downlink communication traffic associated with all wireless devices in communication with access node 106, the types of applications running on the wireless devices, the number of wireless devices in which access node 106 is the primary access node, the total bandwidth available at access node 106, etc.

The first access node 104 can determine a first scheduling scheme from the first access node 104 and a second scheduling scheme for the second access node 106 based on the uplink scheduling request and the interference indicator. The first scheduling scheme associated with access node 104 can be further based on an application requirement of an application running on wireless device 102, a load of the first access node 104, a second interference indicator associated with the first access node, and/or the total amount of resources requested by wireless device 102. The second interference indicator can be indicative of the amount of interference wireless device 102 will experience when transmitting uplink communication to access node 106. For example, the second interference indicator can be associated with an amount of interference wireless device 102 will experience when downlink data is transmitted from access node 104.

The first scheduling scheme and the second scheduling scheme can comprise uplink and downlink portions. When access node 104 determines the first and second scheduling schemes, the uplink portions of the first scheduling scheme are selected such that they do not overlap the uplink portions of the second scheduling scheme. Access node 104 can then communicate the second scheduling scheme to access node 106 such that access node 106 can transmit and receive information from wireless devices in communication with access node 106 based on the second scheduling scheme. In addition, access node 104 can instruct wireless device 102 to communicate uplink data to access node 104 during uplink portions of the first scheduling scheme and to communicate uplink data to access node 106 during the uplink portions of the second scheduling scheme.

In an exemplary embodiment, access node 104 can further instruct access node 106 to modify modes of transmission based on the first scheduling scheme. For example, access node 106 can transmit data using various modes of transmission such as omnidirectional, beam forming, etc. Access node 104 can instruct access node 106 to modify the mode of transmission based on the uplink and downlink configuration of the first scheduling scheme. For instance, when wireless device 102 would experience a greater amount of interference based on transmitting or receiving data from access node 104, access node 106 can modify transmissions such that beam forming can be implemented in a direction away from wireless device 102.

Figure 2:
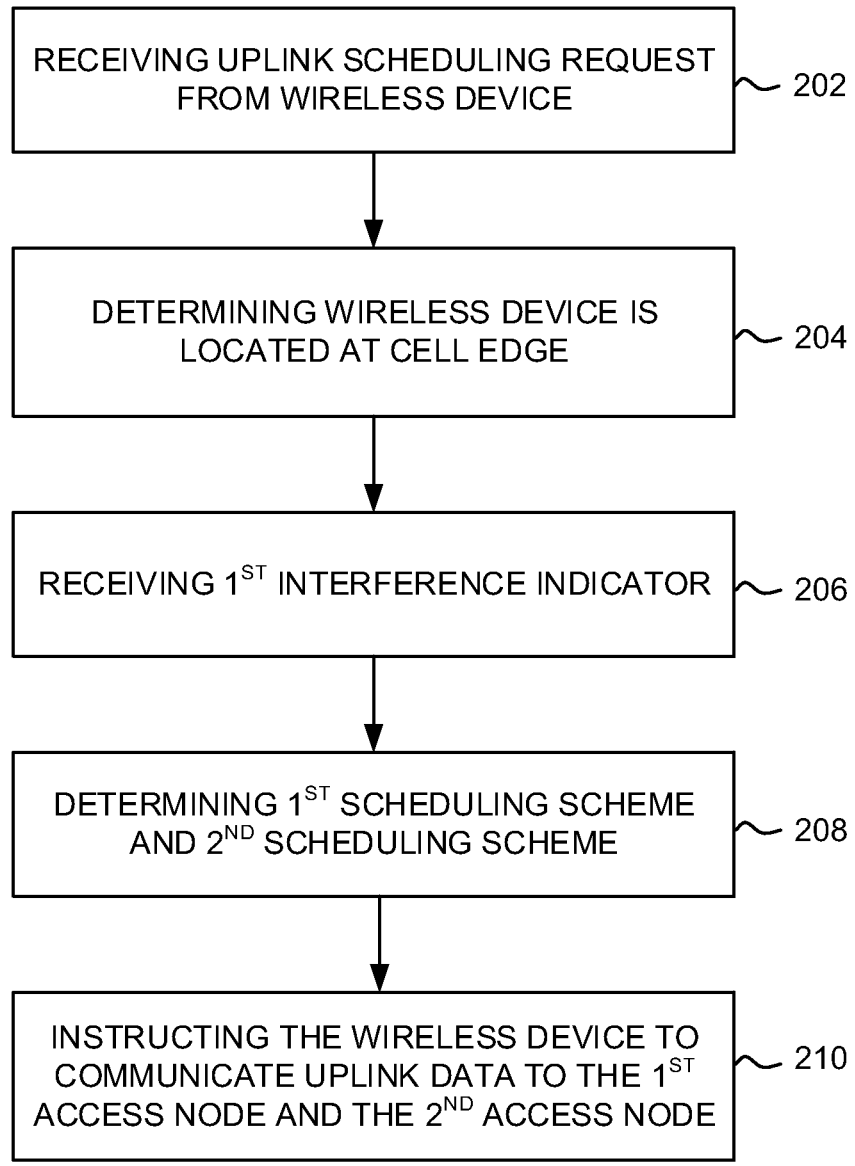
FIG. 2 illustrates exemplary scheduling schemes for scheduling communication in a wireless communication network.

FIG. 2 illustrates a flow chart of an exemplary method of scheduling communication in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a first access node can receive an uplink scheduling request from a wireless device. For example, wireless device 102 can send an uplink scheduling request to primary access node 104 to request uplink resources. The uplink scheduling request can comprise an indication of a total amount of resources requested by wireless device 102, an indication of a first signal characteristic associated with access node 104 detected at wireless device 102, and an indication of a second signal characteristic associated with access node 106 detected at wireless device 102. The signal characteristic can be indicative of a signal quality and/or signal strength. For example, the signal characteristic can be at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR).

The first access node can determine that the wireless device is located at a cell edge based on the uplink scheduling request at 204. For example, access node 104 can compare the first signal characteristic associated with access node 104 and the second signal characteristic associated with access node 106 with a threshold. When both the first signal characteristic and the second signal characteristic meet a threshold, access node 104 can determine that wireless device 102 is within coverage areas 105 and 107 and at the cell edge of both access nodes 104, 106.

When the first access node determines that the wireless device is located at the cell edge, the first access node can receive a first interference indicator from a second access node at 206. The interference indicator can be an indication of the anticipated interference power the wireless device 102 will experience based on a scheduling scheme associated with access node 106. For example, the first interference indicator can be based on an anticipated interference wireless device 102 will experience when downlink data is transmitted from the second access node 106.

At 208, the first access node can determine a first scheduling scheme for the first access node and a second scheduling scheme for the second access node. For example, based on the uplink scheduling request from wireless device 102, access node 104 can determine a first scheduling scheme and a second scheduling scheme. The first scheduling scheme and the second scheduling scheme can comprise uplink portions and downlink portions. The first and second scheduling schemes can be determined such that uplink portions of the first scheduling scheme do not overlap the uplink portions of the second scheduling scheme. In addition, the first scheduling scheme can be further based on the total amount of resources requested by the wireless device 102.

The first access node can instruct the wireless device to communicate uplink data to the first access node during uplink portions of the first scheduling scheme and to communicate uplink data to the second access node during the uplink portions of the second scheduling scheme at 210. For example, access node 104 can communicate the second scheduling scheme to access node 106 and instruct access node 106 to transmit and receive data using the second scheduling scheme. Access node 104 can then instruct wireless device 102 to communicate uplink data to access node 104 during uplink portions of the first scheduling scheme and to communicate uplink data to access node 106 during uplink portions of the second scheduling scheme.

FIGS. 3 and 4 illustrate exemplary scheduling schemes for scheduling communication in a wireless communication network. A scheduling scheme can comprise at least one frame having a plurality of subframes. As illustrated in FIGS. 3 and 4, one frame can comprise ten subframes, however a frame can comprise any number of subframes. A first scheduling scheme can be different from a second scheduling scheme. Each scheduling scheme can include at least one uplink portion to allow a wireless device to transmit data to an access node and at least one downlink portion to allow the wireless device to receive data from an access node.

As illustrated in FIG. 3, a first scheduling scheme associated with access node 104 comprises alternating uplink portions 302 and downlink portions 304. The second scheduling scheme associated with access node 106 also comprises alternating uplink portions 306 and downlink portions 308. However, the uplink portions 306 of the second scheduling scheme do not overlap the uplink portions 302 of the first scheduling scheme. Because the scheduling scheme associated with access node 104 is different from the scheduling scheme associated with access node 106, wireless device 102 can continuously transmit uplink data using the uplink portions 302 and 306.

FIG. 4 illustrates further exemplary scheduling scheme configurations. For example, a first scheduling scheme associated with access node 104 comprises adjacent uplink portions 402 and downlink portions 404 and a second scheduling scheme comprises alternating adjacent uplink portions 406 and downlink portions 408. While exemplary scheduling scheme configurations are illustrated in FIGS. 3 and 4, any scheduling scheme configuration can be used such that wireless device 102 can alternate uplink transmissions between access nodes 104 and 106 to create a continuous uplink transmission where the first scheduling scheme configuration is different from the second scheduling scheme configuration.

Figure 5:
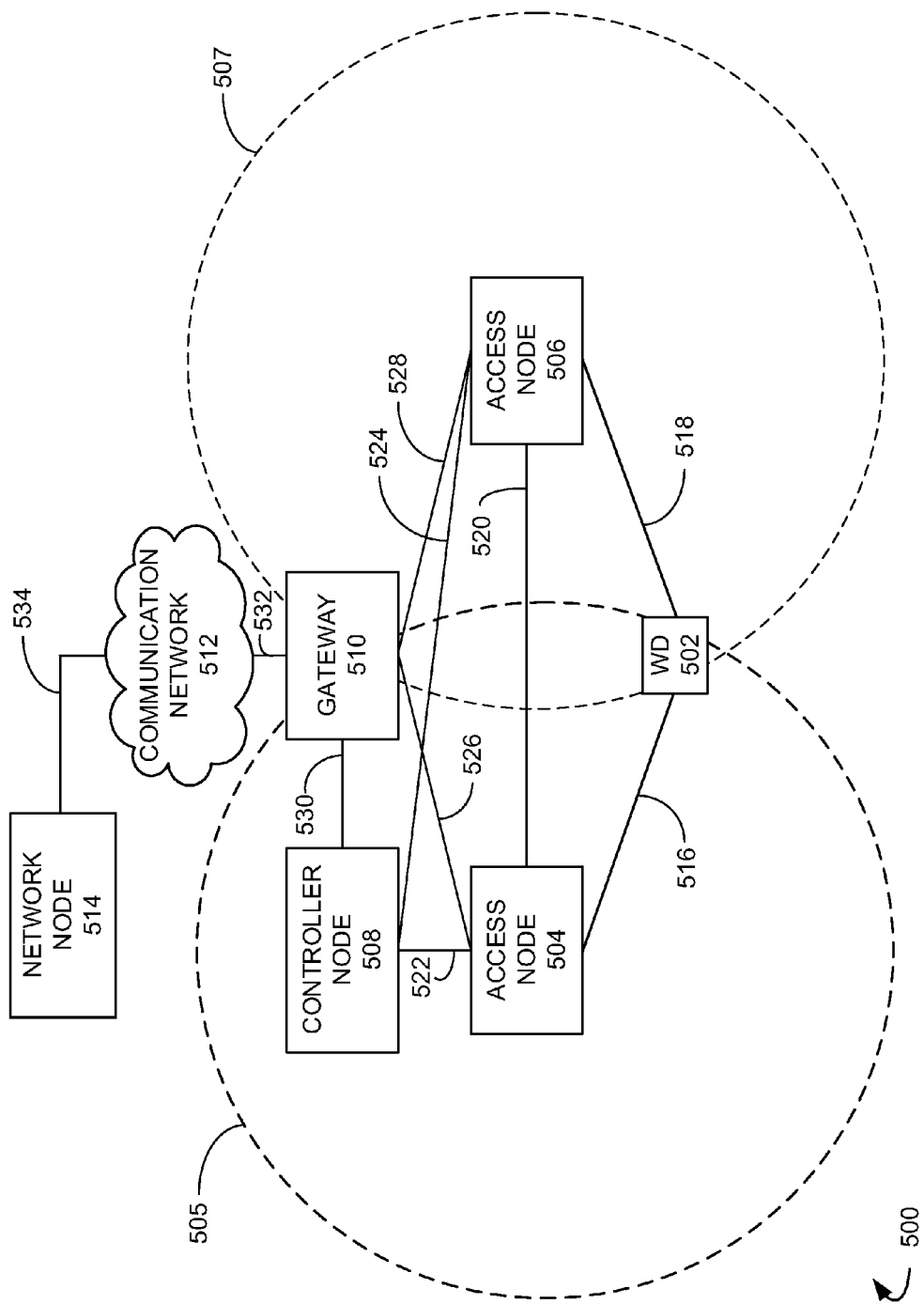
FIG. 5 illustrates another communication system to schedule communications in a wireless communication network.

FIG. 5 illustrates an exemplary communication system 500 for scheduling communication in a wireless communication network. Communication system 500 can comprise a wireless device 502, access nodes 504, 506, controller node 508, gateway 510, communication network 512, and network node 514. Other network elements may be present in the communication system 500 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 504, 506 and communication network 508, which are omitted for clarity, including additional processing nodes, routers, gateways, and physical and/or wireless data links for carrying data among the various network elements.

Wireless device 502 can be any device configured to communicate over communication system 500 using a wireless interface. For example, wireless device 502 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 5 as being in communication with access node 504 or 506, any number of wireless devices can be implemented according to various exemplary embodiments disclosed herein.

The wireless interface of wireless device 502 can include one or more transceivers for transmitting and receiving data over communication system 500. Each transceiver can be associated with the same or different frequency bands, the same or different radio access technologies, the same or different network providers, and/or the same or different services. For example, wireless device 502 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 502 can be in communication with access node 504 through communication link 516 or with access node 506 through communication link 518. Links 516, 518 can use various communication media, such as air, space, metal, optical fiber, or some other signal propagation path—including combinations thereof. Communication links 516, 518 may comprise many different signals sharing the same link Communication links 516, 518 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 502 and access node 504 could share the same representative wireless link, but be transferred over different communication sessions, frequencies, timeslots, packets, ports, sockets, logical transport links, or in different directions—including combinations thereof.

Wireless device 502 can transmit and/or receive information over system 500 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 504, 506 can be any network node configured to provide communication between wireless device 502 and communication network 512. Access nodes 504, 506 can be standard access nodes or short range, low power access nodes. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while two access nodes 504, 506 are illustrated in FIG. 5, any number of access nodes can be implemented within system 500.

Access nodes 504, 506 can comprise a processor and associated circuitry to execute or direct the execution of computer-readable instructions to obtain information. Access nodes 504, 506 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 504, 506 can receive instructions and other input at a user interface.

Controller node 508 can be any network node configured to communicate information and/or control information over system 500. Controller node 508 can be configured to transmit control information associated with a handover procedure. Controller node 508 can be a standalone computing device, computing system, or network component, and can be accessible, for example, by a wired or wireless connection, or through an indirect connection such as through a computer network or communication network. For example, controller node 508 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 308 is not limited to any specific technology architecture, such as Long Term Evolution (LTE) and can be used with any network architecture and/or protocol.

Controller node 508 can comprise a processor and associated circuitry to execute or direct the execution of computer-readable instructions to obtain information. Controller node 508 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 508 can receive instructions and other input at a user interface.

Gateway 510 can be any network node configured to interface with other network nodes using various protocols. Gateway 510 can communicate user data over system 500. Gateway 510 can be a standalone computing device, computing system, or network component, and can be accessible, for example, by a wired or wireless connection, or through an indirect connection such as through a computer network or communication network. For example, gateway 510 can include a serving gateway (SGW) and/or a public data network gateway (PGW), etc. One of ordinary skill in the art would recognize that gateway 510 is not limited to any specific technology architecture, such as Long Term Evolution (LTE) and can be used with any network architecture and/or protocol.

Gateway 510 can comprise a processor and associated circuitry to execute or direct the execution of computer-readable instructions to obtain information. Gateway 510 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 510 can receive instructions and other input at a user interface.

Network node 514 can be any network node configured to receive uplink data from wireless device 102. Network node 514 can be a standalone computing device, computing system, or network component, and can be accessible, for example, by a wired or wireless connection, or through an indirect connection such as through a computer network or communication network. Alternatively, network node 514 can be integrated into any other network node in system 500. Network node 514 can be operated by the same network operator or different network operators. For example, network node 514 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, a serving gateway (SGW), a public data network gateway (PGW), a destination wireless device, etc.

Access node 504 can be in communication with access node 506 through communication link 520. Access node 504 can be in communication with controller node 508 through communication link 522. Access node 506 can be in communication with controller node 508 through communication link 524. Access node 504 can be in communication with gateway 510 through communication link 526. Access node 506 can be in communication with gateway 510 through communication link 528. Controller node 508 can be in communication with gateway 510 through communication link 530. Gateway can be in communication with communication network 512 through communication link 532. Network node 514 can be in communication with communication network 512 through communication link 534. Communication links 520, 522, 524, 526, 528, 530, 532, 534 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 520, 522, 524, 526, 528, 530, 532, 534 can be a direct link or might include various equipment, intermediate components, systems, and networks.

Communication network 512 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 512 can be capable of carrying data, for example, to support voice, push-to-talk, broadcast video, and data communications by a wireless device such as wireless device 502. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 512 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 512 can also comprise additional base stations, controller nodes, telephony switches, internet routers, network gateways, computer systems, communication links, or some other type of communication equipment, and combinations thereof.

In operation, an access node such as access node 504 can receive an uplink scheduling request from wireless device 502. Access node 504 can determine a first scheduling scheme associated with access node 504 and a second scheduling scheme associated with access node 506 based on the uplink scheduling request. Access node 504 can instruct wireless device 502 to communicate uplink data to access node 504 during the uplink portions of the first scheduling scheme and to communicate uplink data to access node 506 during the uplink portions of the second scheduling scheme. The uplink data can be combined from access node 504 and 506 before transmitting the combined uplink data to a network node 514. For example, access node 506 can transmit the uplink data from wireless device 502 to access node 504 over communication link 520 and access node 504 can combine the uplink data from access node 506 with the uplink data received from wireless device 502 before transmitting to network node 514. Alternatively, another node in the network can combine the information it receives from access node 504 and access node 506. For example, access node 504 can transmit the uplink data received from wireless device 502 to controller node 508 or gateway 510. Access node 506 can also transmit the uplink data received from wireless device 502 to controller node 508 or gateway 510. Then controller node 508 and/or gateway 510 can combine the uplink information accordingly and transmit it to network node 514 over communication network 512.

Figure 6:
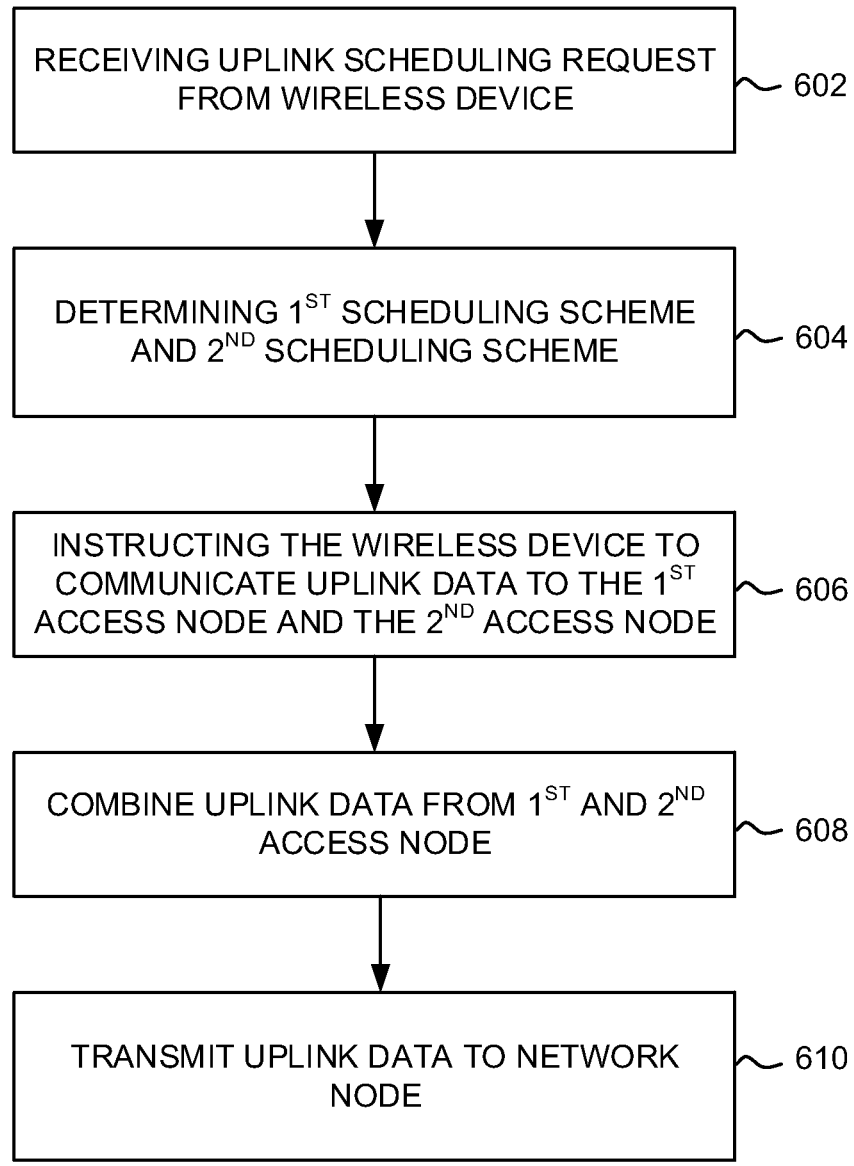
FIG. 6 illustrates another exemplary method of scheduling communication in a wireless communication network.

FIG. 6 illustrates a flow chart of an exemplary method of scheduling communication in a wireless communication network. The method will be discussed with reference to the exemplary communication system 500 illustrated in FIG. 5. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 602, a network node can receive an uplink scheduling request from a wireless device. For example, access node 504 can receive an uplink scheduling request from wireless device 502 where access node 504 is the primary access node of wireless device 502. The uplink scheduling request can comprise an indication of a total amount of resources requested by wireless device 502, an indication of a first signal characteristic associated with access node 504 detected at wireless device 502, and an indication of a second signal characteristic associated with access node 506 detected at wireless device 502. The signal characteristic can be indicative of a signal quality and/or signal strength. For example, the signal characteristic can be at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR).

The network node can determine a first scheduling scheme and a second scheduling scheme at 604. For example, access node 504 can determine a first scheduling scheme associated with access node 504 and a second scheduling scheme associated with access node 506 based on the uplink scheduling request. The first scheduling scheme and the second scheduling scheme can comprise uplink portions and downlink portions. The first and second scheduling schemes can be determined such that uplink portions of the first scheduling scheme do not overlap the uplink portions of the second scheduling scheme. In addition, the first scheduling scheme can be further based on the total amount of resources requested by the wireless device 502.

After communicating the second scheduling scheme to access node 506, access node 504 can instruct wireless device to communicate uplink data to the access node 504 and access node 506 at 606. For example, access node 506 can instruct wireless device 502 to communicate uplink data to access node 504 during uplink portions of the first scheduling scheme and to communicate uplink data to access node 506 during uplink portions of the second scheduling scheme. In an exemplary embodiment, this will allow wireless device 502 to continuously communicate uplink data using the non-overlapping uplink portions of the first and second scheduling scheme.

At 608, a network node can combine uplink data from the first and second access node. In one exemplary embodiment, access node 504 can combine uplink data received from access node 506 with the uplink data received from wireless device 502. Alternatively, another access node such as controller node 508 or gateway 510 can receive the uplink data from access nodes 504 and 506 and combine the uplink data accordingly.

The network node can transmit the uplink data to another network node at 610. For example, access node 504, controller node 508, and/or gateway 510 can transmit the combined uplink data to network node 514.

Figure 7:
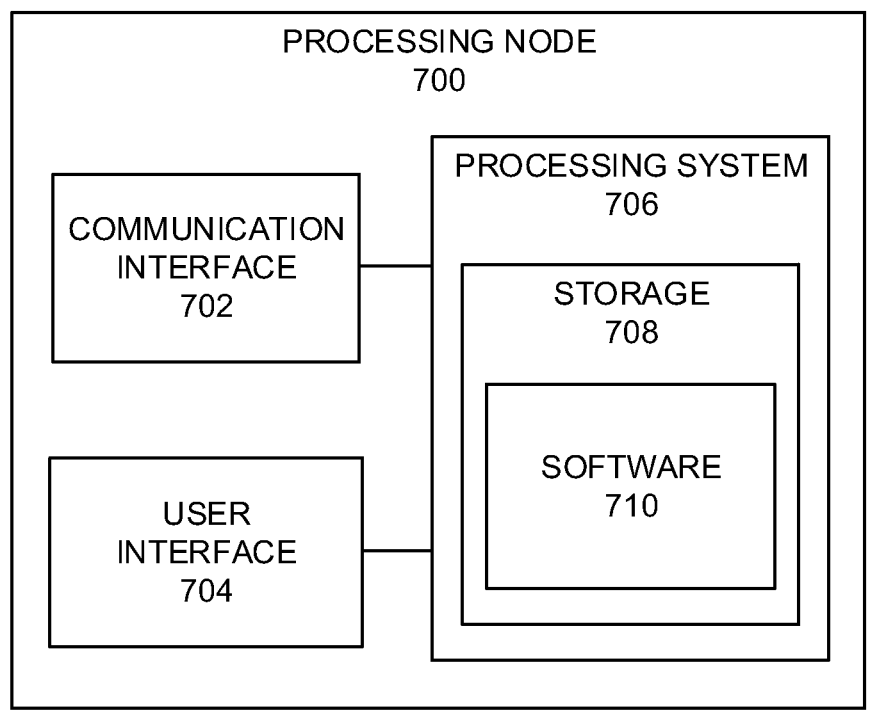
FIG. 7 illustrates a processing node according to an exemplary embodiment.

FIG. 7 illustrates an exemplary processing node 700 in a communication system. Processing node 700 comprises communication interface 702, user interface 704, and processing system 706 in communication with communication interface 702 and user interface 704. Processing node 700 is capable of monitoring communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 106, 504, 506, controller node 508, gateway 510, and network node 514. Processing node 700 can also be an adjunct or component of a network element, such as an element of access nodes 104, 106, 504, 506, controller node 508, gateway 510, and network node 514. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling communication in a wireless communication network, comprising:
   receiving, at a first access node, an uplink scheduling request from a wireless device located at a cell edge of a coverage area of the first access node, the wireless device having an application running on the wireless device;
   determining, at the first access node, a load at the first access node;
   receiving, at the first access node, a first interference indicator from a second access node;
   determining, at the first access node, a first scheduling scheme for the first access node, the first scheduling scheme being based on the uplink scheduling request, an application requirement of the application running on the wireless device, the load at the first access node, and the first interference indicator;
   determining, at the first access node, a second scheduling scheme and transmitting the second scheduling scheme to the second access node, the second scheduling scheme being based on the uplink scheduling request and the first interference indicator, wherein the first scheduling scheme and the second scheduling scheme each comprise alternating uplink portions that do not overlap and downlink portions;
   instructing the wireless device to transmit uplink data to the first access node during the uplink portions of the first scheduling scheme and to transmit uplink data to the second access node during the uplink portions of the second scheduling scheme;
   combining, at the first access node, the uplink data transmitted by the wireless device to the first access node and the uplink data transmitted by the wireless device to the second access node; and
   transmitting, from the first access node, the combined uplink data to a network node.

2. The method of claim 1, wherein the first scheduling scheme is further based on a second interference indicator associated with the first access node.

3. The method of claim 1, wherein the first interference indicator is based on an anticipated interference the wireless device will experience when downlink data is transmitted from the second access node.

4. The method of claim 1, wherein the uplink scheduling request comprises an indication of a total amount of resources requested by the wireless device, an indication of a first signal characteristic associated with the first access node detected at the wireless device, and an indication of a second signal characteristic associated with the second access node detected at the wireless device.

5. The method of claim 4, wherein the first scheduling scheme is further based on the total amount of resources requested by the wireless device.

6. The method of claim 4, wherein the wireless device is determined to be located at the cell edge when the first signal characteristic and the second signal characteristic meet a threshold.

7. The method of claim 1, wherein the first scheduling scheme comprises at least one frame comprising a plurality of subframes such that at least one uplink portion is associated with one subframe and at least one downlink portion is associated with one subframe.

8. The method of claim 7, wherein the first scheduling scheme comprises alternating uplink portions and downlink portions.

9. The method of claim 1, further comprising instructing the second access node to modify modes of transmission based on the first scheduling scheme.

10. A system of scheduling communication in a wireless communication network, comprising:
    a first access node comprising a processing node configured to:
      receive an uplink scheduling request from a wireless device located at a cell edge of a coverage area of the first access node, the wireless device having an application running on the wireless device;
      determine a load at the first access node;
      receive a first interference indicator from a second access node;
      determine a first scheduling scheme for the first access node, the first scheduling scheme being based on the uplink scheduling request, an application requirement of the application running on the wireless device, the load at the first access node, and the first interference indicator;

determine a second scheduling scheme and transmit the second scheduling scheme to the second access node, the second scheduling scheme being based on the uplink scheduling request and the first interference indicator, wherein the first scheduling scheme and the second scheduling scheme each comprise alternating uplink portions that do not overlap and downlink portions;

instruct the wireless device to transmit uplink data to the first access node during the uplink portions of the first scheduling scheme and instructing the wireless device to transmit uplink data to the second access node during the uplink portions of the second scheduling scheme;

combine the uplink data transmitted by the wireless device to the first access node and the uplink data transmitted by the wireless device to the second access node; and transmit the combined uplink data to a network node.

11. The system of claim 10, wherein the first scheduling scheme is further based on a second interference indicator associated with the first access node.

12. The system of claim 10, wherein the first interference indicator is based on an anticipated interference the wireless device will experience based on a transmission from the second access node when the first scheduling scheme is transmitted from the first access node.

13. The system of claim 10, wherein the uplink scheduling request comprises an indication of a total amount of resources requested by the wireless device, an indication of a first signal characteristic associated with the first access node detected at the wireless device, and an indication of a second signal characteristic associated with the second access node detected at the wireless device.

14. The system of claim 13, wherein the first scheduling scheme is further based on the total amount of resources requested by the wireless device.

15. The system of claim 13, wherein the wireless device is determined to be located at the cell edge when the first signal characteristics and the second signal characteristic meet a threshold.

16. The system of claim 10, wherein the first scheduling scheme comprises at least one frame comprising a plurality of subframes such that at least one uplink portion is associated with one subframe and at least one downlink portion is associated with one subframe.

17. The system of claim 10, wherein the first scheduling scheme comprises alternating uplink portions and downlink portions.

18. The system of claim 10, wherein the processing node is further configured to instruct the second access node to modify modes of transmission based on the first scheduling scheme.

\* \* \* \* \*